(12) United States Patent
Nelson

(10) Patent No.: US 8,427,313 B2
(45) Date of Patent: Apr. 23, 2013

(54) EXPENDABLE TAMPER EVIDENT SECURITY SEAL

(75) Inventor: Carl V. Nelson, Derwood, MD (US)

(73) Assignee: The Johns Hopkins University, Baltimore, MD (US)

( * ) Notice: Subject to any disclaimer, the term of this patent is extended or adjusted under 35 U.S.C. 154(b) by 639 days.

(21) Appl. No.: 12/708,825

(22) Filed: Feb. 19, 2010

(65) Prior Publication Data

US 2011/0006895 A1    Jan. 13, 2011

Related U.S. Application Data

(60) Provisional application No. 61/153,761, filed on Feb. 19, 2009.

(51) Int. Cl.
*G08B 13/00* (2006.01)
(52) U.S. Cl.
USPC ..... 340/541; 340/10.1; 340/545.1; 340/572.8
(58) Field of Classification Search ............... 340/541, 340/10.1, 545.1, 545.2, 545.6, 545.8, 540, 340/572.1–572.9, 10.5, 568.1; 235/492, 235/487, 493
See application file for complete search history.

(56) References Cited

U.S. PATENT DOCUMENTS

| | | | |
|---|---|---|---|
| 7,068,170 B2 | 6/2006 | Green | |
| 7,155,343 B2 * | 12/2006 | Grant et al. | 702/2 |
| 7,215,249 B2 | 5/2007 | Carrender et al. | |
| 7,712,674 B1 * | 5/2010 | Warner et al. | 235/492 |
| 7,880,611 B2 * | 2/2011 | Angell et al. | 340/540 |
| 2004/0227632 A1 * | 11/2004 | Grijalva et al. | 340/550 |

* cited by examiner

*Primary Examiner* — Anh V La
(74) *Attorney, Agent, or Firm* — Noah J. Hayward

(57) ABSTRACT

An expendable tamper evident seal system for monitoring a mechanism to which physical access is required in order to open or close an access-way, comprising: an embedding material moldable into a shape conforming to the mechanism and adapted to be applied to the mechanism; circuit components randomly embedded in the embedding material so as to be arranged in positions and orientations corresponding to the shape, whereby physical access to the mechanism that alters the shape of the embedding material correspondingly alters the positions and orientations of the circuit components in the material; and an electronic interrogation device (EID) including components that induce in the circuit components an electromagnetic spectral response indicative of the position of the EID relative to the positions and orientations of the circuit components in the material, and measure the spectral response.

24 Claims, 10 Drawing Sheets

EXPENDABLE TAMPER EVIDENT SECURITY SEAL

CROSS REFERENCE TO RELATED APPLICATIONS

This application claims priority to U.S. Provisional Application No. 61/153,761, filed Feb. 19, 2009, incorporated herein by reference in its entirety.

FIELD OF THE INVENTION

The invention relates generally to physical security seals.

BACKGROUND OF THE INVENTION

Approximately 20 million cargo shipping containers are in use throughout the world. Both ship and air transport use cargo shipping containers. With the need for increased security, these shipping containers are typically secured with locks and security seals. Given enough time and the right tools, any locked container can be breached. Modern high security seals do not aim to defeat shipping container break-ins but instead are designed to alert when the container has been compromised, opened or tampered with. These modern seals are called tamper evident security seals (TESS). There are a number of TESS devices on the market, but most are expensive to purchase and when damaged by an intruder are expensive to repair or replace. In the case of a low-cost TESS that uses a wire or other loop-like device to attach itself to a container, the looping device can be by-passed to get access to the container's interior.

For illustrative purposes of prior art a portion of a shipping container cargo door 100 is shown in FIG. 1. FIG. 1 shows prior art security seal technology 102 which is composed of a simple loop 103 and lock 104. In addition, FIG. 1 illustrates the complex nature of the shipping container topology with locking handle 105 and rotating locking pin 106.

FIG. 2 shows a simplified drawing of the prior art hasp and locking technique for a container door. A container 205 includes container sides 210 to which are attached container doors 215 through respective hinges 220. A hasp 225 (having lower and upper hasps sections) is connected to doors 215 via bolts 230 or other fastening means. Doors 215 are secured with a lock and or security seal 235 passing through hasp holes 240 through the lower and upper hasp sections of hasp 225.

SUMMARY OF THE INVENTION

The present invention is a low cost, expendable, easy to use TESS designed to be difficult to circumvent. The field of application of the xTESS is not limited to just cargo containers but can be used for securing any type of container. In addition to being used on locks and container/door hasps, the xTESS of the subject invention can be used on hinges or any other complex object including fully encasing the object. A system embodiment of the present invention is a tamper evident seal system for monitoring a mechanism to which physical access is required in order to open or close an access-way, comprising:

an embedding material moldable into a shape conforming to the mechanism and adapted to be applied to the mechanism;

circuit components randomly embedded in the embedding material so as to be arranged in positions and orientations corresponding to the shape, whereby physical access to the mechanism that alters the shape of the embedding material correspondingly alters the positions and orientations of the circuit components in the material; and an electronic interrogation device (EID) including components that
induce in the circuit components an electromagnetic spectral response indicative of the position of the EID relative to the positions and orientations of the circuit components in the material, and
measure the spectral response.

Other apparatus, system and method embodiments of the present invention will be apparent based on the ensuing description.

DETAILED DESCRIPTION OF THE DRAWINGS

The present invention is an expendable tamper evident security seal (xTESS) designed to be inexpensive and difficult to defeat. The xTESS uses electromagnetic sensor technology as a security seal for containers (e.g., cargo containers) and the like to determine whether the containers have been opened or tampered with.

Figure 1:
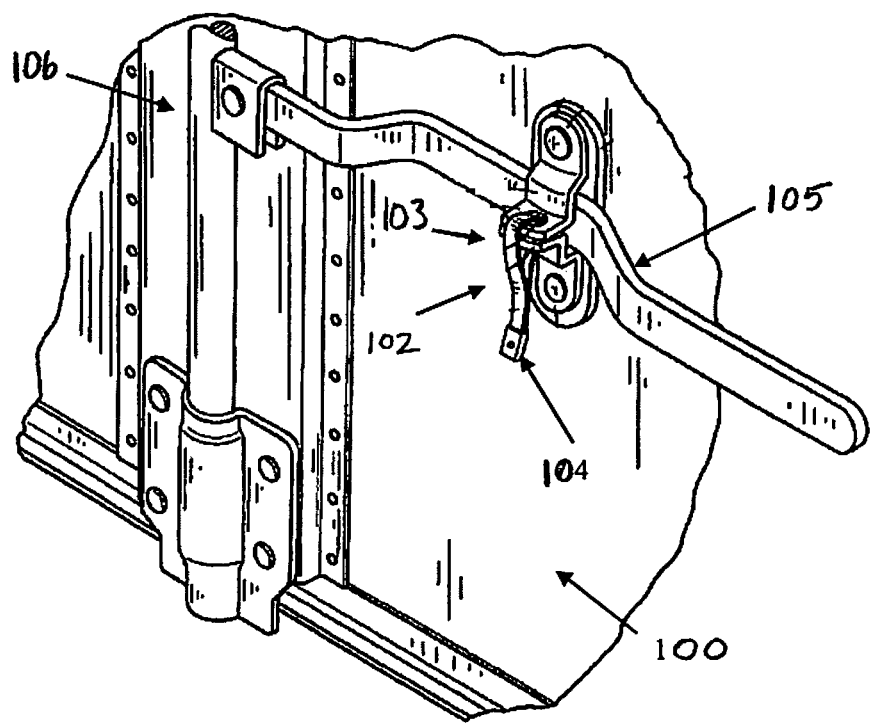
FIG. 1 shows a prior art security seal.
Figure 2:
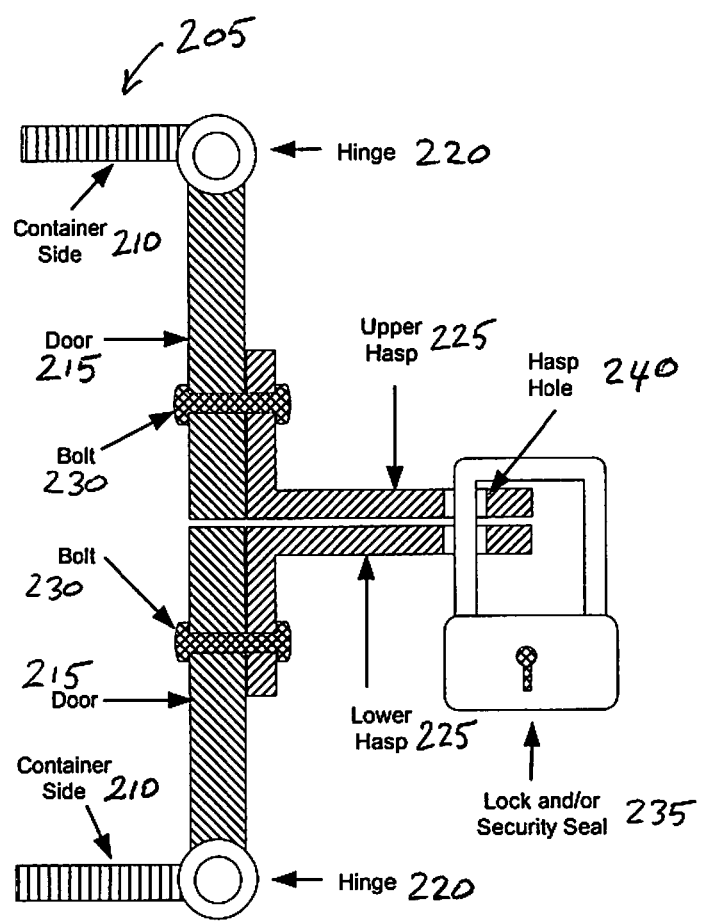
FIG. 2 shows a prior art locking mechanism.
Figure 3:
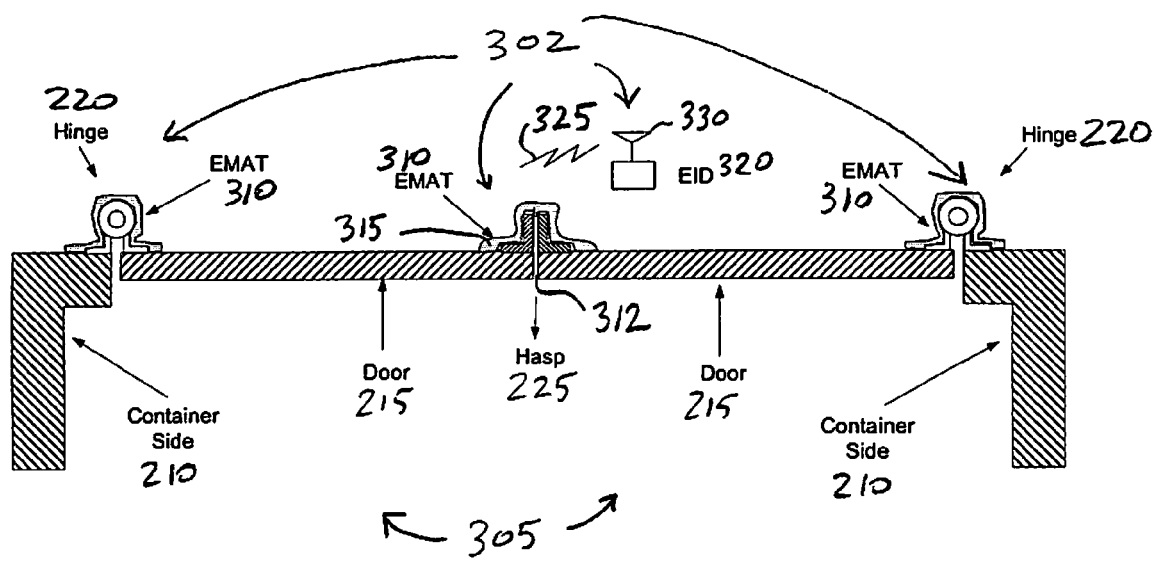
FIG. 3 is an illustration of an exemplary xTESS system of the present invention used to secure a shipping container.

FIG. 3 is an illustration of an exemplary xTESS system 302 of the present invention used to secure a shipping container 305, depicted in top view. Depicted in FIG. 3 is a top view of cargo container 305 along with the following components of xTESS system 302:

an embedding material (called the EMAT) 310 that can be molded into shapes and has adhesive properties when attached to a structure (e.g., applied to hasp 225, doors 215 near the hasp, across a seam 312 between the doors, and hinges 220);

multiple passive or active electromagnetic components (also referred to herein as "tags," "tag components," "circuit components," or "electronic circuit components") 315 embedded in the embedding material 310 (in FIG. 3, tags 315 are depicted as small dots in embedding material 310); and an electronic interrogation device (EID) 320 that interacts via wireless signals 325 with the tags 315 embedded in the EMAT 310.

There are a wide range of tags 315 that could embedded in the EMAT 310 and used in the xTESS system 302, including: passive RFID tags (known in the art), active RFID tags (known in the art), passive resonate antennas, semiconductor components, passive optical materials and passive magnetic materials. The art of passive and active RFID tags is extensive and as will be shown in this document, can be easily adapted as tag components 315 of the xTESS system 102. Combinations of inductors, resistors, capacitors and semiconductor components (e.g., diodes) connected together to form LR, LC, CR and LRC resonate circuits (which are known in the art) can also be adapted as tag components. Magnetic circuit components with different inductive properties can also be adapted as tag components 315. Metal and semiconductor material can be tag components. In addition, the tags 315 could be optic in nature (optical tags are also electromagnetic tags operating at much higher frequencies compared to typical RF devices operating at frequencies in the range of GHz). The tags 315 could also be a combination of the above listed components 315. Many tags 315 are embedded in random positions and three-dimensional orientations within the EMAT 310, each with a different electromagnetic property indicative of its unique position and orientation.

The EMAT 310 that holds the tags could be a flexible semi-rigid substance like clay, chewing gum, plumbers putty or other similar functional material. The EMAT 310 that holds the tags 315 could also be a rigid substance like epoxy, potting compound (known in the art) or cement or other similar functional material.

The EID 320 includes at least one antenna 330 that transmits a complex signal 325 that interacts with the tags 315 and at least one receiver that measures the interaction of the tags with the transmitted signal. A computing device within the EID measures the xTESS tag response signal (e.g., amplitude, phase and frequency) 325 (also referred to herein as an electromagnetic spectral response) from the multiple random tags 315 embedded in the EMAT 310 and records and documents its complex signal. This tag response signal (or xTESS signature" is then recorded along with the cargo container's unique identification number. Any attempt to remove the EMAT 310 will disturb the tags 315 embedded therein and thereby change the unique electromagnetic signature of the EMAT and tags when the EMAT was originally formed and applied to the structure.

In FIG. 3 the EMAT 310 has been applied not only to the locking hasp 225, which will be locked via lock or security seal 235, but also to the hinges 220 of the doors 215 for added security. Note that the soft moldable embedding material of EMAT 310 has been molded into a shape that conforms to the complex topology of the door hasp/lock (225, 215) combination and hinges 310.

Figure 4:
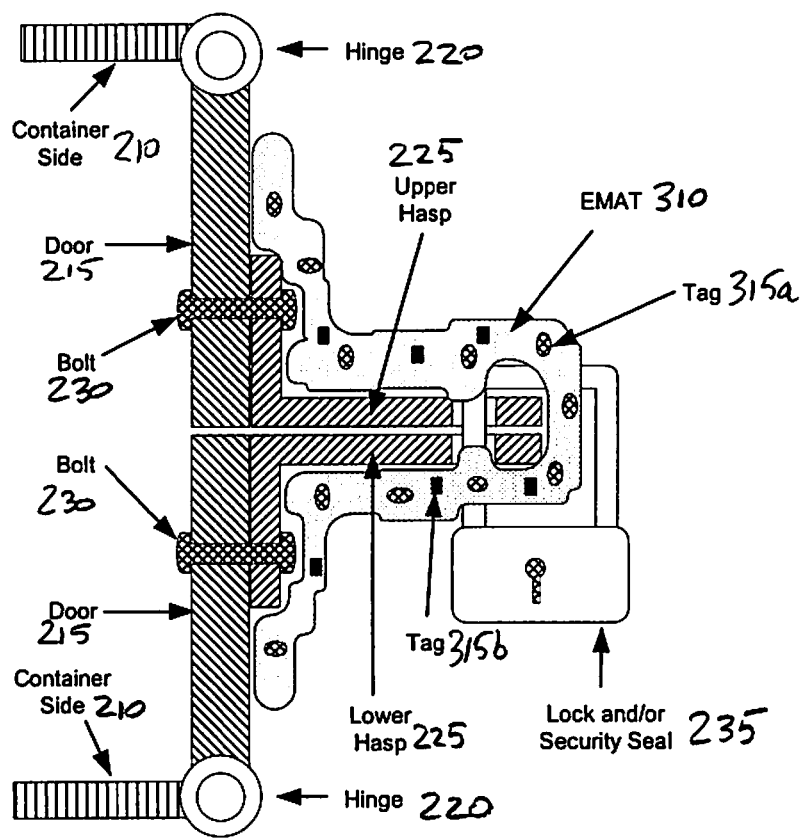
FIG. 4 shows a close-up simplified block diagram of one embodiment of the system of FIG. 3 in use.

FIG. 4 shows a close-up simplified block diagram of one embodiment of the xTESS EMAT 310 applied to the hasp 225. Specifically, FIG. 4 shows more details of the EMAT material 310 enveloping the hasp lock 235 and hasp securing bolts 230. Multiple different types of tags 315a, 315b are embedded in the EMAT 310. For clarity, FIG. 4 schematically shows only two different types of tags 315, however a wide range and a larger number of different types of tags 315 could be embedded in the EMAT 310 and used in the xTESS system 302.

Figure 5:
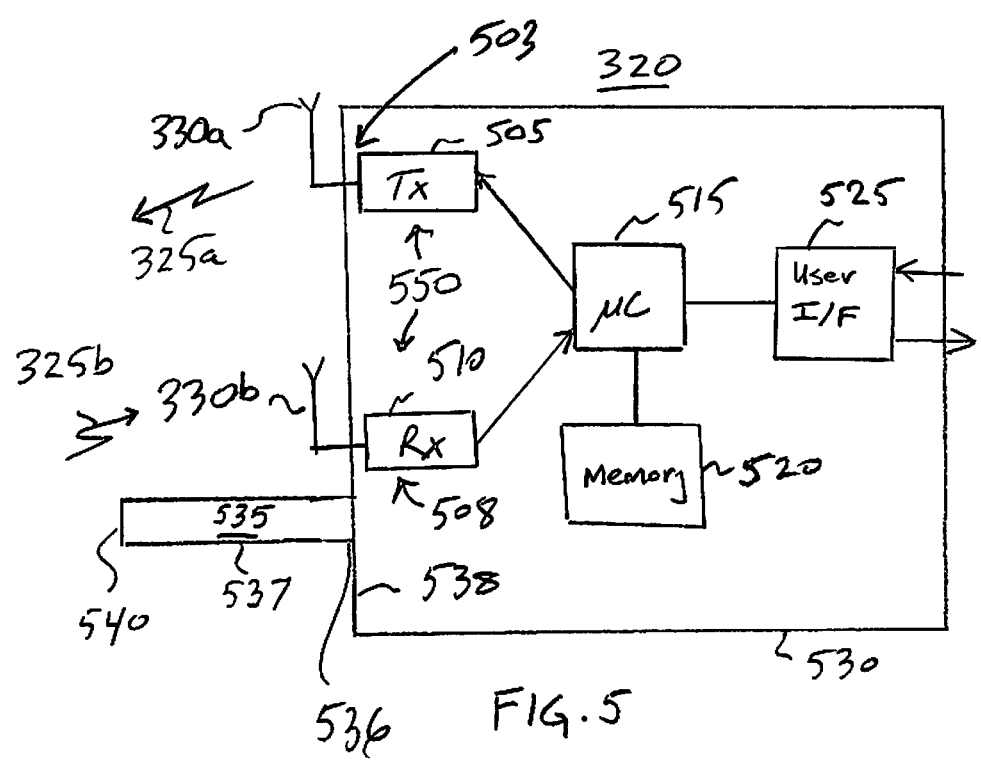
FIG. 5 illustrates an example of an Electronic Interrogation Device (EID) of the present invention.

FIG. 5 illustrates an example of EID 320. Portions of EID 302 are known in the art by other names and functions. For examples, RFID tag readers are know (e.g., U.S. Pat. No. 7,215,249, incorporated herein by reference in its entirety). EID 320 includes a transmitter 503, including transmitter components 505 (e.g., amplifier, filter) coupled with antenna 330a, that operate together to transmit a wireless signal 325a that interacts with the tags 315, so as to induce in the tags a response signal (also referred to as an electromagnetic spectral response signal or simply spectral response) 325b that is indicative of the positions and orientations of the tags. Response signal 325b exhibits an amplitude-frequency spectrum unique to the positions and arrangements of tags 315 in EMAT 310.

EID 320 also includes a receiver 508, including antenna 330b and receiver components 510 (e.g., amplifier, filter and digitizer), for receiving and preprocessing (e.g., amplifying, filtering and digitizing) the induced response signal 325b. In an embodiment, antennas 330a and 330b may be combined into a single transmit-receive antenna. Together, transmitter and receiver 503, 508 form a transceiver 550 of EID 320 for transceiving wireless signals 325 with tags 315.

EID 320 also includes a processor 515 that communicates with the other subsystems of the EID to control the EID and both process and store information, measurements and signals. Receiver 508 provides received signal 325b to processor 515 in a form on which the processor is able to make amplitude, frequency and phase measurements. Processor 515 is coupled with a memory 520 for storing information and computer code to be executed by the processor in order to perform methods of the present invention. Processor 515 stores into memory 520 received signal 325b (as received from receiver 508) and measurement derived there from.

EID 320 also includes a user interface 525 coupled with processor 515 that includes an indicator, such as a display and/or audible indicator, and an input device, such as a keypad. The input device accepts unique identification numbers, e.g., identifying a specific cargo container, which are stored in memory 520 along with received response signals.

EID 320 also includes a housing 530 for enclosing at least some of the components 505-525. A physical orienting mechanism, such as at least one physical protuberance, 535 has an end 536 attached to the housing and an elongate portion 537 extending outwardly from the housing, preferably from a side 538 of the housing that is adjacent or next to antennas 330. An exemplary elongate length of orienting mechanism 535 ranges from a few inches to two feet. Orienting mechanism 535 can be made of any resilient material, such as metal, plastic, and so on. In an embodiment, orienting mechanism 535 is an antenna of EID 320, such as one of antennas 330. As will become apparent from the description below, an end portion 540 of orienting mechanism 535 is provided for physically contacting EMAT 310 when the EMAT is applied to a structure (such as a hinge), so as to physically orient EID 320 (and more specifically its antennas 330) in a fixed position relative to tags 315 in the EMAT. When in this fixed position, EID 320 is located at a fixed distance from the tags 315 and at a fixed relative orientation with respect to the tags.

As will be discussed more fully below, because the spectral response 325b is a composite signal that includes many different individual responses from the many different tags 315 embedded in the EMAT 310, the spectral response forms a unique lock signature associated with the emplaced xTESS EMAT 310. This unique lock signature (LS) is stored or recorded along with the cargo container's unique identification number (IDN), which may be manually entered into EID 320 via keyboard 525 or entered by an optical or RF scanning technology known in the art from a tag or plaque on the container. The LS and IDN are then used at the time the container is opened to see if the container has been tampered with.

Figure 6:
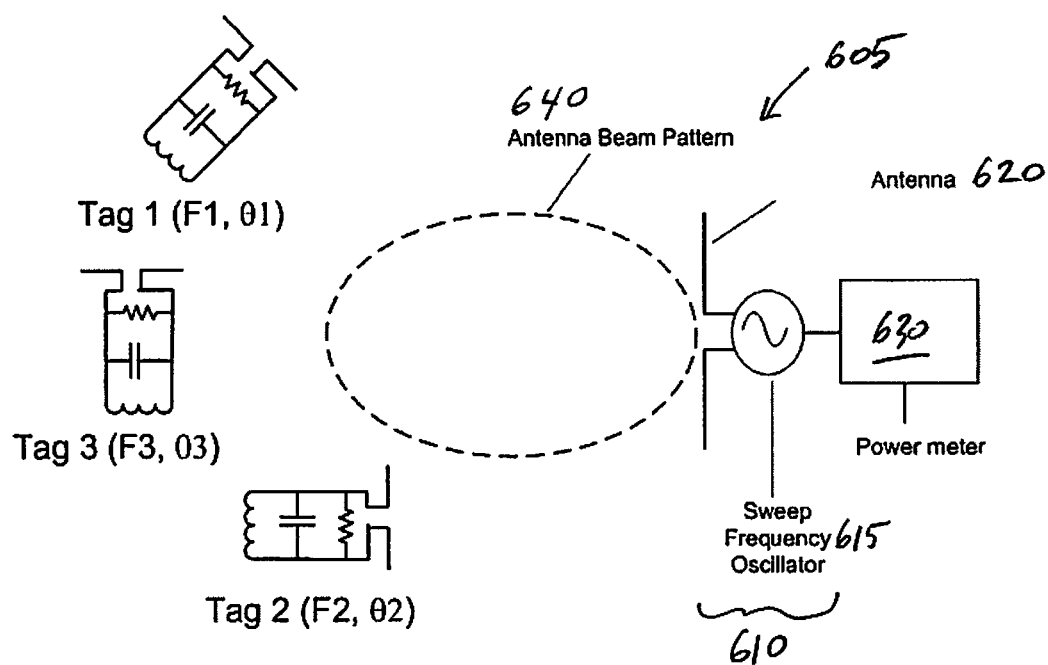
FIG. 6 is a front-end portion of an EID configured as a grid dip meter (GDM).

In an embodiment, EID 320 operates in a manner similar to that known in the art as a grid dip meter (GDM) (also known as a grid dip oscillator). In FIG. 6, there is depicted only a front-end portion 605 of EID 320. Front-end portion 605 is configured as a GDM that measures a resonant frequency of radio frequency circuits. GDM 605 can be used to measure the amount of radio frequency (RF) electromagnetic field energy absorbed by nearby objects. GDM 605 is coupled with processor 515, not shown. The GDM is composed of RF transmitter 610 (which, in FIG. 6 encompasses oscillator 615 and antenna 620, where antenna 620 also serves as a receive antenna), a power source and a means, such as a power meter, 630 to measure the output energy of the RF transmitter. It is known in the art that the RF transmitter energy output changes (decreases) in the vicinity of a resonant circuit which is tuned to the frequency of the oscillator. The nearby resonant circuit of the tags absorbs power from the GDM.

Also depicted in FIG. 6 are three tags TAG 1 (or T1), TAG 2 (or T2) and TAG 3 (or T3) located in two dimensional space near GDM 605. The three tags T1-T3 are illustrated as small RF dipoles with an LCR circuit that have sharp resonates at three different frequencies (F1, F2 and F3), are oriented at three different angles ($\theta 1$, $\theta 2$ and $\theta 3$) and are three different distances from the GDM antenna of transmitter 620. The tags' antennas have an approximate dipole antenna pattern that varies with spatial orientation. The GDM antenna is illustrated as a dipole which also has a spatially varying antenna pattern 640. The GDM 605 transmits three frequencies, F1, F2 and F3. At each frequency the GDM 605, via meter 630, measures the amount of absorbed power A1-A3 from the three tags T1-T3 (see FIG. 7, discussed below). Since the absorbed power from the tags T1-T3 is a function of relative orientation of the transmitter and receiver antenna patterns (of antenna 605) and the distance between the transmitter and receivers, the absorbed power is different for each tag.

Figure 7:
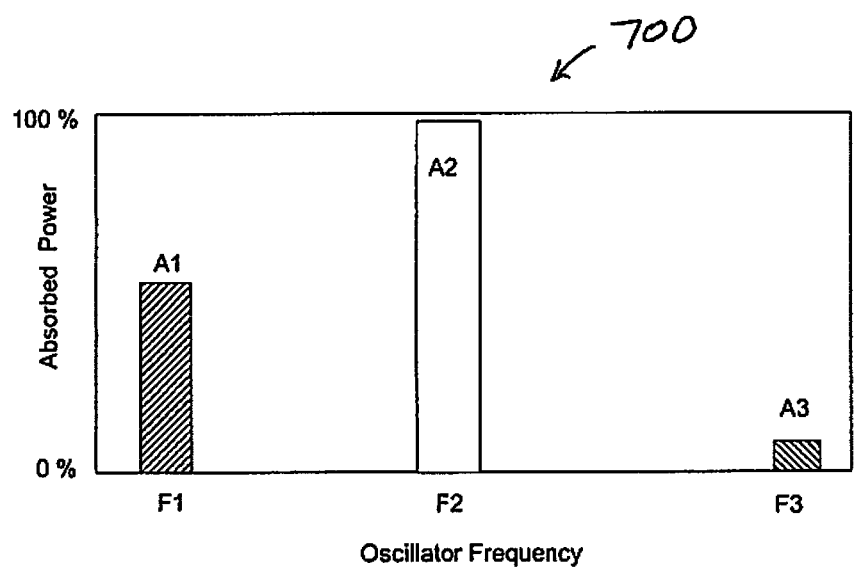
FIG. 7 is an model response in Frequency vs. Absorbed power format of the GDM.

FIG. 7 illustrates an example model response 700, in Frequency vs. Absorbed power format, from the GDM power meter 630. T1 is oriented at a 45° angle relative to the transmitter 620 and therefore has a moderate transmitter to receiver coupling and moderate power absorption A1. T2 is oriented in a direction that is close to maximum coupling between the transmitter and receiver antennas and therefore has a large power absorption A2. T3 is oriented in a direction that has minimum coupling between the transmitter and receiver antennas and therefore has a low power absorption A3.

As illustrated in FIG. 7 we can construct a unique combination code from the three frequencies F1-F3 with respective multiple amplitudes A1-A3 for respective tags T1-T3. As an example, if we assume we have three frequencies with amplitude resolution of 100 we can construct a combination with nearly 160,000 unique codes. Adding a fourth frequency with an amplitude resolution of 100 we can have nearly 4,000,000 unique codes.

In a more realistic and sophisticated GDM system the frequency spectrum is a continuum with frequency broadening. The addition of frequency broadening adds more complexity to the xTESS tags' uniqueness thus enhancing the security of the xTESS coding. In addition, RF phase information from the tags could be measured by the EID to further enhance the signature coding. Techniques for adding more complexity to the xTESS concept is described in the next embodiments.

Another embodiment of the xTESS device uses the same tag arrangement as described above using three different RF resonate tags but now adds more tags so that there are now multiple tags with resonate frequency F1, multiple tags at resonate frequency F2 and multiple tags at resonate frequency F3. This arrangement increase the complexity of the response as measured by the GDM. In some cases the different tags with interact with each other and modify the measured amplitude, phase and frequency spectrum.

Another embodiment of the xTESS device uses the same tag arrangement as described above using three different RF resonate tags but now adds small bits of metal that act as reflectors of RF energy. This additional material adds more complexity to the measured response of the GDM which enhances the security of the xTESS device.

Another embodiment of the xTESS device uses the same tag arrangement as described above using three different RF resonate tags but now adds a diode to the circuit. This additional material adds more complexity to the measured response of the GDM by the non-linear nature of the diode excitation. Harmonics of the excitation frequency can now be detected by the receiver thus adding more unique frequencies to the code.

Figure 8:
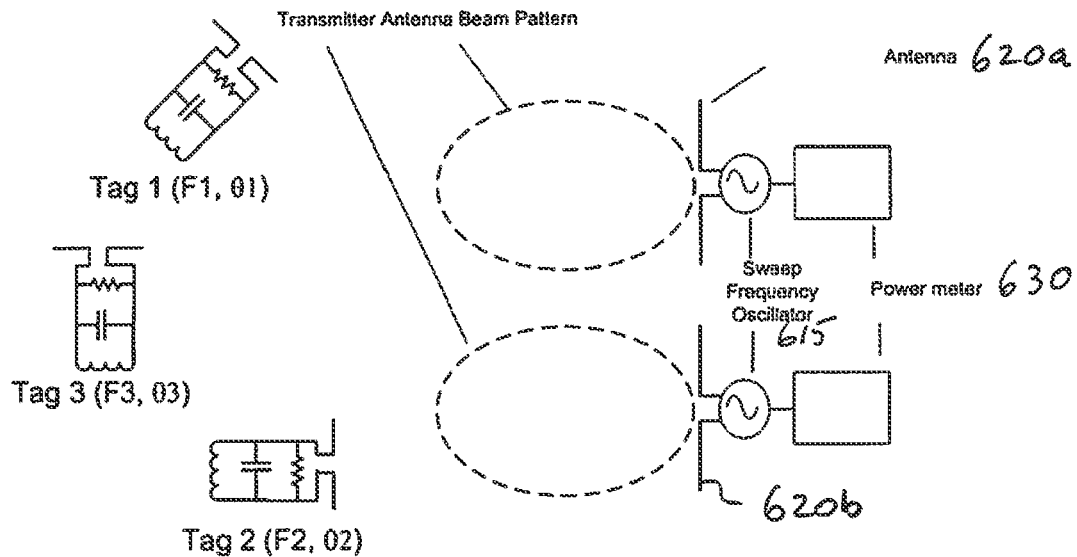
FIG. 8 is a block diagram of another embodiment of the EID in the GMD configuration that uses two transmitters and two spatially divergent antennas.
Figure 9:
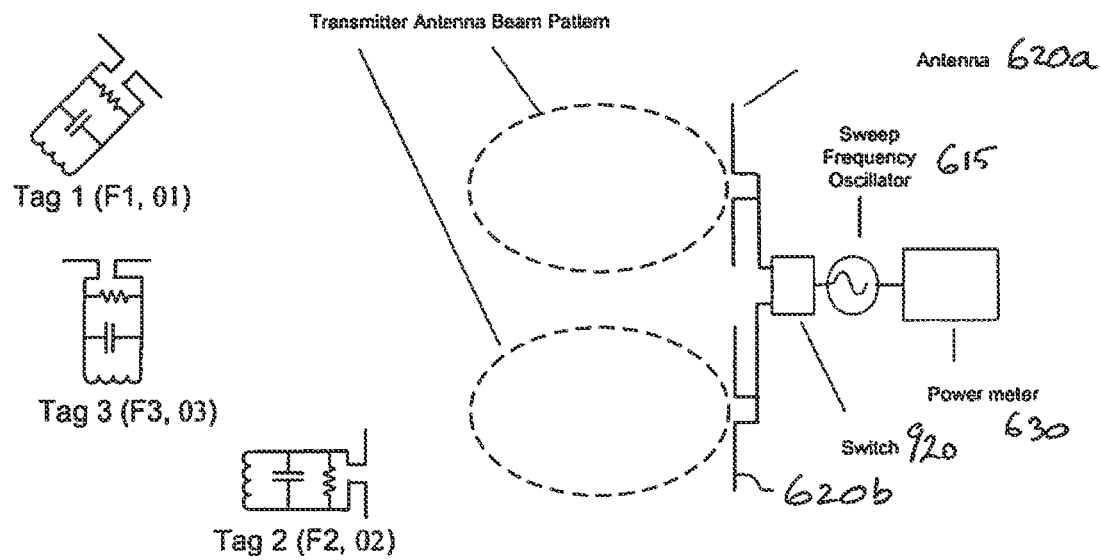
FIG. 9 shows yet another embodiment of the EID in the GMD configuration that uses the two transmitters.

FIG. 8 shows another embodiment of the EID in the GMD configuration that uses two transmitters and two spatially divergent antennas. FIG. 9 shows yet another embodiment of the EID in the GMD configuration that uses the two transmitters, but a single circuit (oscillator) drives the two spatially divergent antennas with the application of a simple switch 920 thus reducing the cost of the EID. With the addition of a second transmitter antenna the number of unique codes from the embedded tags will double because the two antennas are at different spatial positions and orientations relative to the tags. However, this is not the most important feature of adding two or more antennas to the EID.

Consider a counter measure to the xTESS device. A person tries to defeat the xTESS system by using electronic test equipment known in the art and measures the unique xTESS EMAT code. The person breaks the xTESS seal (EMAT) and opens the container. The container now has been compromised. The door of the container is closed and a counterfeit xTESS seal is put in place of the original seal. The counterfeit seal has an electronic circuit (also known as spoofing device) embedded in a counterfeit EMAT. The spoofing device has been programmed to mimic the original signature of the xTESS seal. When the container arrives at its security check point, the EID is used to measure the unique code that was recorded when the container was originally sealed. If the EID uses one antenna in the GDM version of the EID the EID will have difficulty telling the difference between the original and counterfeit seals.

Now consider that the EID uses two antennas. Each antenna records simultaneously a unique RF code from the xTESS seal based on the relative orientation of individual multiple tags with different characteristics (e.g., resonate frequency and antenna orientation). Single or multiple spoofing devices cannot replicate the unique signature seen by the two EID antennas. The spoofing device or devices would need to replicate all of the original tags and the distance and orientation relative to the EID antenna. However, the original xTESS seal was destroyed during the process of opening the container. Adding a third or a fourth antenna, easily done with a switch as shown in FIG. 9, to the EID would further enhance the security integrity of the xTESS.

Another embodiment of the xTESS device could use active RFID tag technology. In this embodiment the xTESS system would have available a number of different active RFID tags. When the EMAT is manufactured it will contain some of the active RFID tags within the material. The EID would transmit a spectrum of frequencies that would communicate with the RFID tags embedded in the EMAT. The active RFID tag technology could have unique digital code that is unique to the EMAT material.

Note that the EMAT is molded onto the hasp and locking mechanism. To remove the xTESS from the hasp and locking mechanism would require that the EMAT be pulled apart. This would disturb the locations of the tags relative to each other and hence modify the xTESS signature.

Operation of the xTESS System

Operation of the present invention as a security seal is now described. A feature of the present invention that supports such operation is described as follows. As mentioned above, many tags 315 are embedded in random, three-dimensional orientations within the EMAT 310, each with a different electromagnetic property. Initially, the EMAT 315 can be molded onto (i.e., fixed or applied to) a structure (e.g., the hasp and locking mechanisms 225, 235, of a container). The EMAT will conform to the shape of the structure to which it is affixed. As affixed, the EMAT 310 holds the tags in their fixed positions relative to the structure and each other in the conforming shape of the EMAT. Accordingly, the tags will have a unique spectral response corresponding to the initial shape when the tags are interrogated by EID 320.

Any subsequent physical access to the EMAT 310 (e.g., caused by an attempt to move, remove, or deform the EMAT) that alters the shape of the EMAT 310 will correspondingly alter or disturb the tags 315 embedded in the EMAT and, therefore, correspondingly change the unique electromagnetic spectral response of the tags compared to the response when the EMAT was in the original or initial shape. The change in response is indicative of tampering with the EMAT 310 and structure to which it is affixed. In operational use, it is preferable to induce a spectral response in tags 315 and then measure that response when EID 320 is in a same position that can be repeated time and time again. This is described further in connection with FIG. 10.

Figure 10:
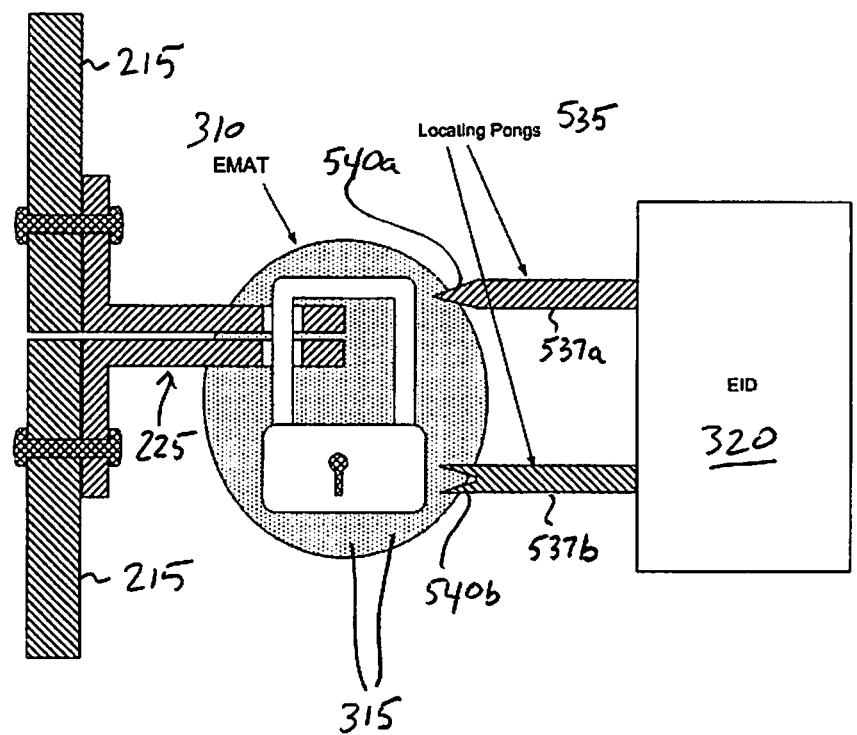
FIG. 10 is an illustration of the EID in a fixed position so as to measure a spectral response of embedded tags.

FIG. 10 is an illustration of EID 320 in a fixed position so as to measure a spectral response of tags 315 in EMAT 310. In FIG. 10, EMAT 310 is emplaced on a structure, e.g., hasp 225. It is preferable that there be a unique and repeatable relative orientation reference between EID 320 and EMAT 310 (and tags 315 therein) when an electronic spectral response is induced in tags 315 and then measured by the EID. The embodiment of EID 320 depicted in FIG. 10 includes a pair of prongs 537 as orienting mechanism 535 that help provide a repeatable orientation for multiple measurements taken at different times.

At least one of locating prongs 537 is used to physically contact, e.g., make a physical impression in, the (soft) EMAT 310. The locating prong holds EID 320 a fixed distance from EMAT 310 and holds the EID at a fixed orientation relative to the EMAT. Preferably, an end 540b of the one locating pong has a unique geometry, such as a forked or V shape, that will leave a unique impression in the EMAT, whereby the EID orienting mechanism can be repeatedly placed in that same impression, so as to similarly orient the EID and EMAT relative to each other each time a measurement is taken. Multiple locating pongs 537a, 537b as shown in FIG. 10 add robustness to the repeatability of the procedure. Note that, as depicted in the embodiment of FIG. 10, the ends of the two locating pongs 537a, 537b used for contacting EMAT 310 are different, thus further increasing the repeatability of placing EID 320 in a single orientation relative to the EMAT 310. The locating prongs can also be used to house the RF antennas as described above.

Method Flow Chart

Figure 11:
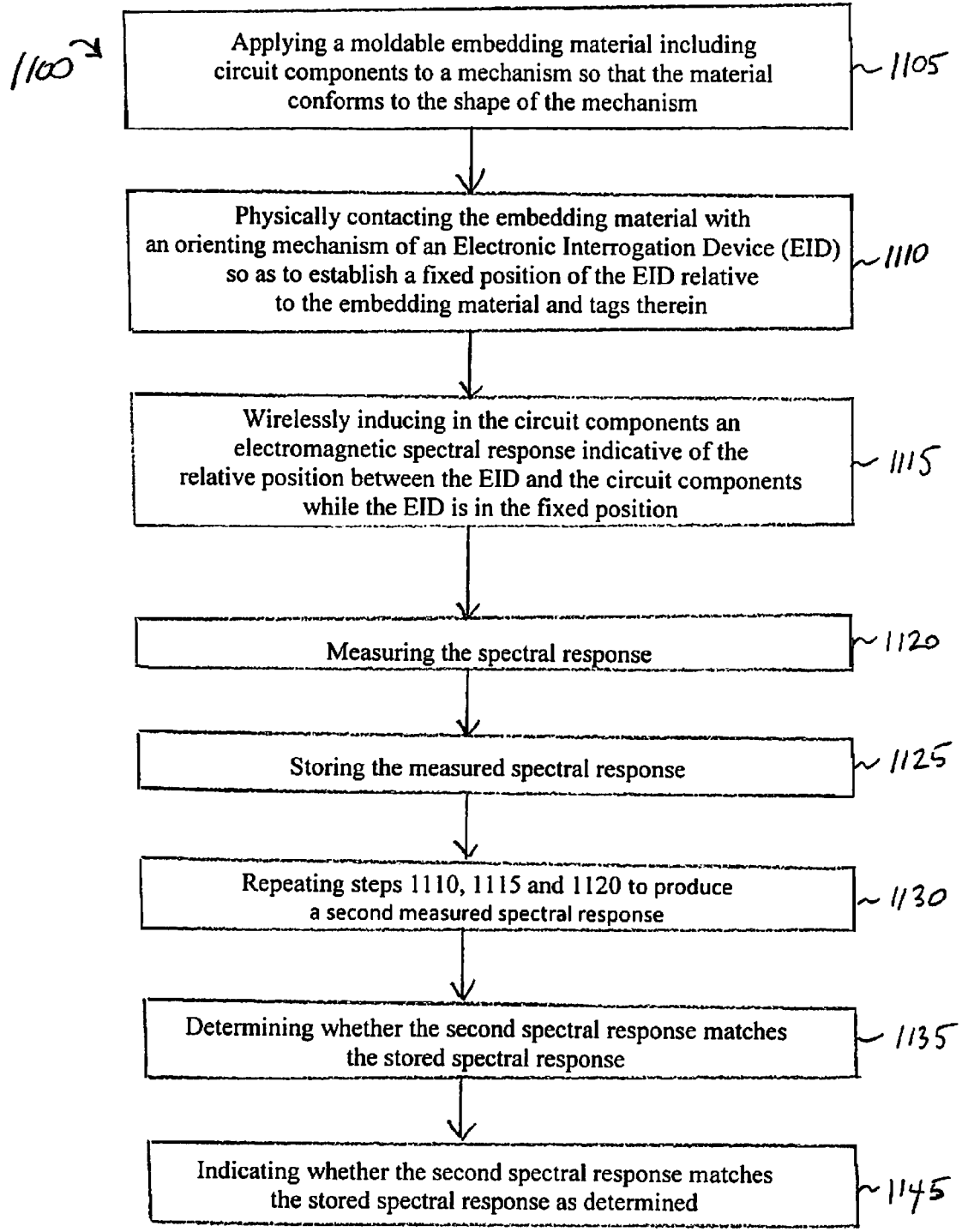
FIG. 11 is a flowchart of an example method of using the xTESS system.

FIG. 11 is a flowchart of an example method 1100 of using tamper evident seal system 302.

An initial step 1105 includes applying EMAT 310 to a mechanism (e.g., one or more of hinges, hasps, locks, seams, and doors) to which physical access is required in order to open an access-way (e.g., a door, window, etc.) on a container (e.g., a shipping container). Usually, EMAT 310 would be applied to the mechanism in this step 1105 when the access-way is in its closed position. Therefore, EMAT 310 conforms to the shape of the mechanism to which it is applied and, therefore, tags 315 are arranged in positions and orientations corresponding to that shape.

A next step 1110 includes physically contacting EMAT 310 with end 540 of orienting mechanism 535 of EID 320, so as to physically orient the EID in a fixed position relative to tags 315 in the EMAT. This positions EID 320 at a fixed distance from, and at a fixed orientation relative to, tags 315. This contacting step is optional, but preferable for most accurate and repeatable measurement results.

A next step 1115 includes wirelessly inducing in tags 315 an electromagnetic spectral response indicative of the relative position between EID 320 and the tags (and the positions of the tags relative to each other, and thus, the shape of the EMAT) while the EID is in the fixed position. The response exhibits an amplitude-frequency spectrum specific to the current configuration (i.e., shape and locations) of the EMAT. This step includes transmitting from EID 320 wireless signal 325a so as to induce the spectral response from tags 315.

A next step 1120 includes measuring the induced spectral response while EID 320 is in the fixed position. Measured parameters include frequency, amplitude, and, optionally, phase, which together represent a security code (also referred to as a unique signature). This step includes wirelessly receiving the spectral response at EID 320 while the EID is in the fixed position.

A next step 1125 includes storing in memory 520 the measured spectral response and measurements thereof (e.g., frequency and amplitude, and possibly phase) as a baseline measurements. Optionally, a container identification number or other unique marking is inputted to EID 320 and stored therein. Steps 1120 and 1125 are performed using processor 515.

In the event the seal system 302 is being used to monitor access to a shipping container, after step 1125, the shipping container is shipped from its current location to a remote destination.

After time has elapsed since step 112, a next step 1130 includes repeating steps 1110, 1115 and 1120 to produce a second measured spectral response indicative of the shape of the EMAT 310. In the shipping container example, this step is performed after the container arrives at its destination, and just before authorized personnel are ready to remove the EMAT so as to open the container.

A next step 1135 includes determining, via processor 515, whether the spectral response stored in step 1125 matches the second spectral response measured in step 1130. The determining step includes (i) a direct comparison between the before and after spectral responses, (ii) a comparison between the before (step 1120) and after (step 1130) measurements based on the spectral responses, e.g., amplitude, frequency, and, possibly, phase, or (iii) both types of comparisons. A match between the before and after spectral responses indicates that EMAT 320 has not been tampered with in any meaningful way. On the other hand, if the before and after spectral responses do not match, i.e., they are different from each other, then this would indicate that the EMAT has been tampered with.

A next step 1145 includes indicating, via user interface 525, a result of the determination made in step 1135, e.g., whether the before and after spectral responses match.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A tamper evident seal system for monitoring a mechanism to which physical access is required in order to open or close an access-way, comprising:
   an embedding material moldable into a shape conforming to the mechanism and adapted to be applied to the mechanism;
   circuit components randomly embedded in the embedding material so as to be arranged in positions and orientations corresponding to the shape, whereby physical access to the mechanism that alters the shape of the embedding material correspondingly alters the positions and orientations of the circuit components in the material; and
   an electronic interrogation device (EID) including components that
   induce in the circuit components an electromagnetic spectral response indicative of the position of the EID relative to the positions and orientations of the circuit components in the material, and
   measure the spectral response.

2. The system of claim 1, wherein the EID includes:
   a physical orienting mechanism for physically contacting the embedding material so as to physically orient the EID in a fixed position relative to the circuit components in the embedding material, whereby the induced and measured spectral responses are indicative of the relative position of the EID relative to the circuit components when the EID is in the fixed position.

3. The system of claim 2, wherein the EID further includes:
   a transmitter adapted to transmit a wireless signal that induces in the circuit components the spectral response while the EID is in the fixed position;
   a receiver for receiving the spectral response while the EID is in the fixed position, whereby the spectral response is indicative of the relative position between the EID and the circuit components;
   a processor for measuring the received spectral response and for processing the measured spectral response; and
   an indicator to indicate a result of the processing.

4. The system of claim 3, wherein the EID further includes a memory for storing the measured spectral response.

5. The system of claim 4, wherein the EID processor
   compares the stored measured spectral response to a current measured spectral response, and
   causes the indicator to indicate a result of the comparison.

6. The system of claim 2, wherein the EID further includes a housing and the orienting mechanism is formed as at least one protuberance from the housing, the protuberance including an end for contacting the embedding material.

7. The system of claim 6, wherein the orienting mechanism includes two protuberances having ends thereof for simultaneously contacting the embedding material.

8. The system of claim 1, wherein the fixed position includes a fixed distance and a relative orientation between the EID and the circuit components.

9. The system of claim 1, wherein the embedding material has an adhesive property by which the embedding material is affixed to the mechanism.

10. The system of claim 1, wherein the embedding material comprises a semi-rigid clay composition.

11. The system of claim 1, wherein the circuit components include passive electromagnetic components that exhibit frequency resonances when excited by the wireless signal, such that the spectral response exhibits an amplitude-frequency spectrum indicative of the relative position between the EID and the circuit components.

12. The system of claim 11, wherein at least some of the circuit components are radio frequency identification (RFID) circuit components.

13. The system of claim 11, wherein each of the circuit components includes at least an inductor-capacitor (LC) resonant circuit.

14. The system of claim 13, wherein each of at least some of the circuit components includes an inductor-capacitor-resistor (LCR) resonant circuit.

15. The system of claim 13, wherein each of at least some of the circuit components includes a diode.

16. The system of claim 1, wherein the EID further includes at least two antennas for transceiving wireless signals between the EID and the circuit components.

17. The system of claim 1, wherein the mechanism is one of a hinge, a lock, and a door seam.

18. A method of monitoring a mechanism to which physical access is required in order to open or close an access-way, comprising:
   Providing:
   an embedding material moldable into a shape conforming to the mechanism and adapted to be applied to the mechanism;
   circuit components randomly embedded in the embedding material so as to be arranged in positions and orientations corresponding to the shape, whereby physical access to the mechanism that alters the shape of the embedding material correspondingly alters the different positions and orientations of the circuit components in the material; and
   an EID including
   a physical orienting mechanism for physically contacting the embedding material so as to physically orient the EID in a fixed position relative to the circuit components in the embedding material; and components for transceiving wireless signals with the circuit components;

applying the embedding material to the mechanism when the access-way is closed;

using the EID, physically contacting the embedding material with the orienting mechanism so as to establish the fixed position of the EID;

wirelessly inducing in the circuit components an electromagnetic spectral response indicative of the relative position between the EID and the circuit components while the EID is in the fixed position;

measuring the spectral response; and storing the measured spectral response.

19. The method of claim 18, further comprising, after time has elapsed from said storing step, performing the following using the EID:

physically contacting the embedding material with the orienting mechanism so as to re-establish the fixed position of the EID relative to the circuit components in the embedding material;

wirelessly inducing in the circuit components a second electromagnetic spectral response indicative of the relative position between the EID and the circuit components while the EID is in the re-established fixed position;

measuring the second spectral response indicative of the re-established fixed position; and determining whether the measured second spectral response matches the stored spectral response.

20. The method of claim 19, wherein between said steps of storing and physically contacting, the method further comprises shipping a structure on which the access-way resides from one physical location to another.

21. The method of claim 19, further comprising:

providing an indication of whether the second spectral response matches the stored spectral response.

22. The method of claim 19, wherein the spectral responses are amplitude-frequency spectrums.

23. The method of claim 18, wherein the applying step includes applying the embedding material to at least one of a hinge, a seam in a door of the access way, and a lock on a door of the access way.

24. The method of claim 18, wherein the access-way is a door and the mechanism is one of a hinge, lock and door seam.

* * * * *